United States Patent
Puhl

(10) Patent No.: US 7,423,224 B2
(45) Date of Patent: Sep. 9, 2008

(54) WIRE BUNDLE ROUTING ASSEMBLY AND INSTALLATION METHOD

(75) Inventor: Ronald A. Puhl, Poland, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/640,164

(22) Filed: Dec. 15, 2006

(65) Prior Publication Data

US 2008/0142259 A1 Jun. 19, 2008

(51) Int. Cl.
*H02G 3/18* (2006.01)
(52) U.S. Cl. .................. 174/650; 174/655; 174/657; 16/2.1; 439/604; 296/208
(58) Field of Classification Search .................. 174/650, 174/655, 657, 660, 668–669, 153 G, 152 G, 174/135; 16/2.1, 2.2; 248/56; 439/604, 439/587; 296/208, 146.1
See application file for complete search history.

(56) References Cited

U.S. PATENT DOCUMENTS

| | | | | |
|---|---|---|---|---|
| 5,092,647 A | * | 3/1992 | Ueda et al. | 296/146.9 |
| 6,079,764 A | * | 6/2000 | Suzuki et al. | 296/146.1 |
| 6,278,060 B1 | * | 8/2001 | Mori | 174/650 |
| 6,312,046 B1 | * | 11/2001 | Sora et al. | 296/208 |
| 6,479,748 B2 | | 11/2002 | Mori | |
| 6,825,416 B2 | * | 11/2004 | Okuhara | 174/668 |
| 6,942,276 B2 | * | 9/2005 | Meurou et al. | 296/146.1 |
| 7,244,894 B1 | * | 7/2007 | Lipp | 174/650 |

* cited by examiner

*Primary Examiner*—Dhiru R Patel
(74) *Attorney, Agent, or Firm*—David P. Wood

(57) ABSTRACT

A wire bundle routing assembly for routing and at least partially enclosing and sealing a wire bundle between a a vehicle door frame and a vehicle door body. A door mounting base is slidably receivable in a slot formed in a front wall of a door body and includes a wire bundle through-hole. A door mounting base cover at least partially encloses and holds the wire bundle against an inner side of the door mounting base when the cover is installed over the inner side of the door mounting base. A base slide track detent surface on the door mounting base engages a corresponding cover slide track detent surface on the cover and guides the cover as the cover is slid into an installed position on the mounting base.

16 Claims, 4 Drawing Sheets

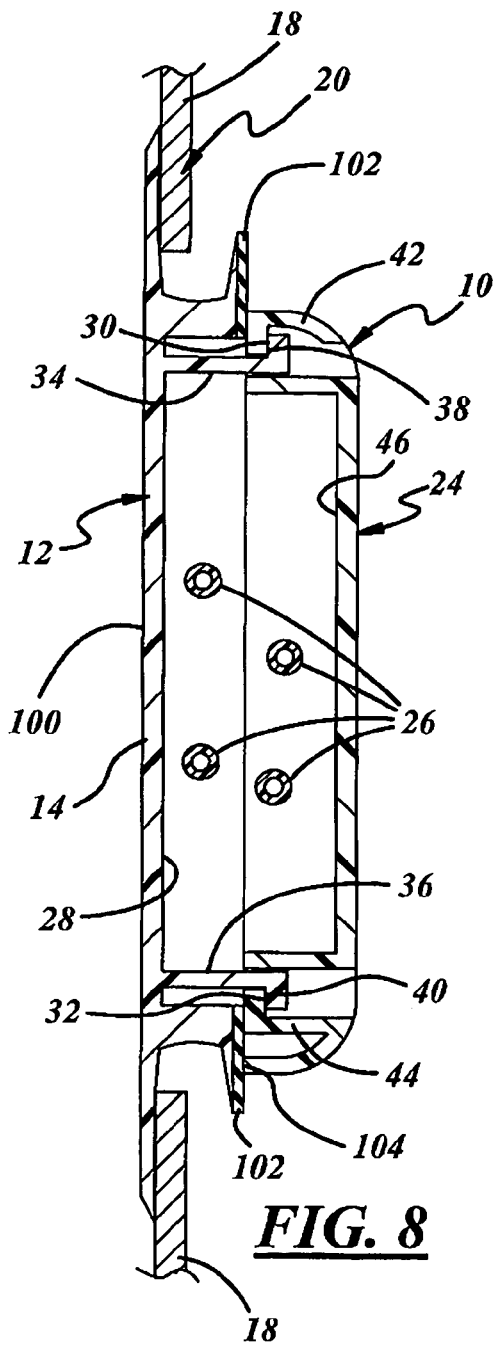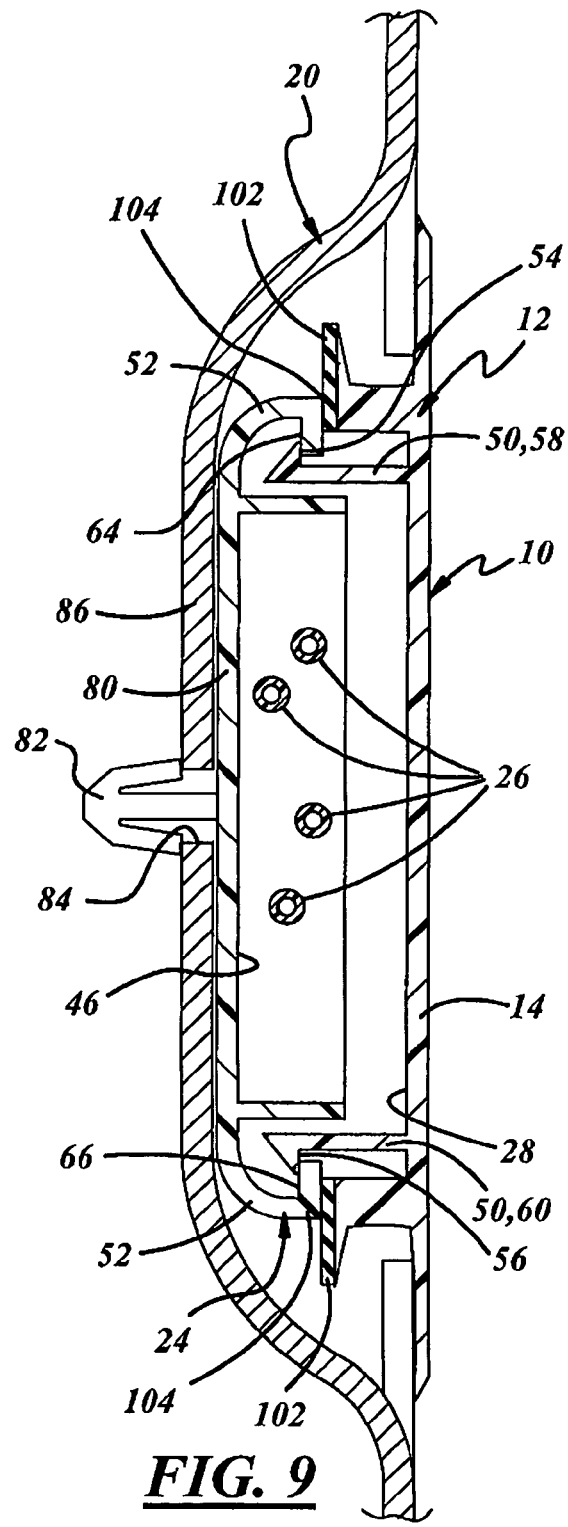

WIRE BUNDLE ROUTING ASSEMBLY AND INSTALLATION METHOD

BACKGROUND OF THE INVENTION

This invention relates generally to a wire bundle routing assembly for routing and at least partially enclosing and sealing a wire bundle or harness between a vehicle door frame and a passenger compartment side of a vehicle door body adjacent hinges pivotally supporting the door on the door frame.

Wire bundle routing assemblies are used to rout and at least partially enclose and seal a portion of a wire bundle or wiring harness that must extend between a vehicle door frame and a passenger compartment side of a vehicle door body via a front wall of the vehicle door body adjacent hinges pivotally supporting the door on the door frame. A wire bundle routing assembly of this type may include a door frame connector, a door mounting base, and a tubular bellows that connects the door frame connector to the door mounting base and flexibly encloses a portion of the wire bundle that extends between the door frame connector and a through-hole in the door mounting base. The door frame connector electrically connects one end of the wire bundle to a complementary connector receptacle supported on a vehicle door frame. The door mounting base is supported on the front wall of the door body and routes the wiring bundle to the passenger compartment side of the vehicle door body where the wires of the bundle may then be routed to various door-mounted accessories.

For example, U.S. Pat. No. 6,479,748B2 issued 12 Nov. 2002 to Mori discloses a wire bundle routing assembly of this type. A front panel of the door mounting base is slidably receivable in a slot formed in a front wall of a door body. A side panel of the door mounting base is disposed generally perpendicular to the front panel. Front and side wire bundle through-holes are formed through the respective front and side panels. A tubular bellows connects a door frame connector of the assembly and an outer side of the door mounting base in coaxial alignment with the front wire bundle through-hole and supports a portion of a wire bundle. From the tubular bellows the wire bundle extends through the front wire bundle through-hole and a door mounting base passage that routs the wire bundle through the side wire bundle through-hole. The wire bundle routing assembly disclosed in the Mori patent also includes a recess formed into and around a periphery of the door mounting base to slidably receive door front wall edges that define the slot formed in the front wall of the door body to receive the assembly.

Also, whatever's shown in photos 3 and 4, discloses another wiring bundle routing assembly similar to that disclosed in the Mori patent, but including a door mounting base cover that connects over an inner side of the door mounting base by aligning five locking tabs with five locking tab receiving holes in the cover. The cover encloses and holds a portion of the wire bundle against the inner side of the door mounting base. Also, a rubber seal strip is supported on the inner side of the door mounting base and is shaped to align with edges of the cover when the cover is installed, to prevent moisture from passing between the door mounting base and the cover. The cover sandwiches the rubber seal strip against the inner side of the door mounting base when the cover is installed. However, this assembly provides no indication to an installer when a wire has been trapped around a locking tab or when one or more of the locks have failed to engage during installation.

What's needed is a wire bundle routing assembly and installation method that can provide an indication to an installer that a wire has been improperly routed and trapped around a locking tab or that one or more of the locks failed to fully engage during installation.

SUMMARY OF THE INVENTION

A wire bundle routing assembly is provided for routing and at least partially enclosing a wire bundle between a vehicle door frame and a passenger compartment side of a vehicle door body adjacent hinges pivotally supporting the door on the door frame. The assembly may include a door mounting base slidably receivable in a slot formed in a front wall of a door body. A wire bundle through-hole may be formed in the door mounting base. The assembly may further include a door mounting base cover configured to enclose and hold the wire bundle against an inner side of the door mounting base when the cover is installed over the inner side of the door mounting base. A base slide track detent surface on the door mounting base may be configured and positioned to engage a corresponding cover slide track detent surface on the cover and to guide the cover as the cover is slid into an installed position on the mounting base. This arrangement provides an installer with an indication that a wire has been trapped because a trapped wire will prevent the detent surfaces from engaging during installation.

Alternatively, the wire bundle routing assembly may include a latch comprising a base latch component carried by the base and a cover latch component carried by the cover, and the cover latch component may be configured to engage the base latch component when the cover reaches the installed position and to retain the cover in the installed position on the base. The latch may further be configured such that the cover latch component cannot engage the base latch component unless aligned by proper engagement of the first cover slide track detent surface with the first base slide track detent surface.

In addition, a method is provided for routing and at least partially enclosing a wire bundle or harness between a vehicle door frame and a passenger compartment side of a vehicle door body adjacent hinges pivotally supporting the door on the door frame. According to the method, a wire bundle routing assembly is provided that includes a door mounting base, a door mounting base cover, a first base slide track detent surface on the door mounting base, and a first cover slide track detent surface on the cover. A wire bundle is provided in a through-hole formed in the front panel of the door mounting base, and a portion of the wire bundle is enclosed against an inner side of the door mounting base by installing the cover on the inner side of the door mounting base. The enclosing step includes engaging the first cover slide track detent surface against the first base slide track detent surface and sliding the cover along a track defined by the engagement of the detent surfaces until the cover reaches an installed position on the mounting base.

Alternatively, the step of enclosing a portion of the wire bundle against an inner side of the door mounting base may include providing a latch comprising a base latch component carried by the base and a cover latch component carried by the cover, and sliding the cover toward the installed position until the cover latch component engages the base latch component when the cover reaches the installed position.

BRIEF DESCRIPTION OF THE DRAWINGS

These and other features and advantages will become apparent to those skilled in the art in connection with the following detailed description and drawings of one or more embodiments of the invention, in which:

FIG. 8 is a cross-sectional view of the installed wire bundle routing assembly of FIG. 1 taken along line 8-8 of FIG. 6; and FIG. 9 is a cross-sectional view of the installed wire bundle routing assembly of FIG. 1 taken along line 9-9 of FIG. 3.

DETAILED DESCRIPTION OF THE PREFERRED EMBODIMENTS

Figure 3:
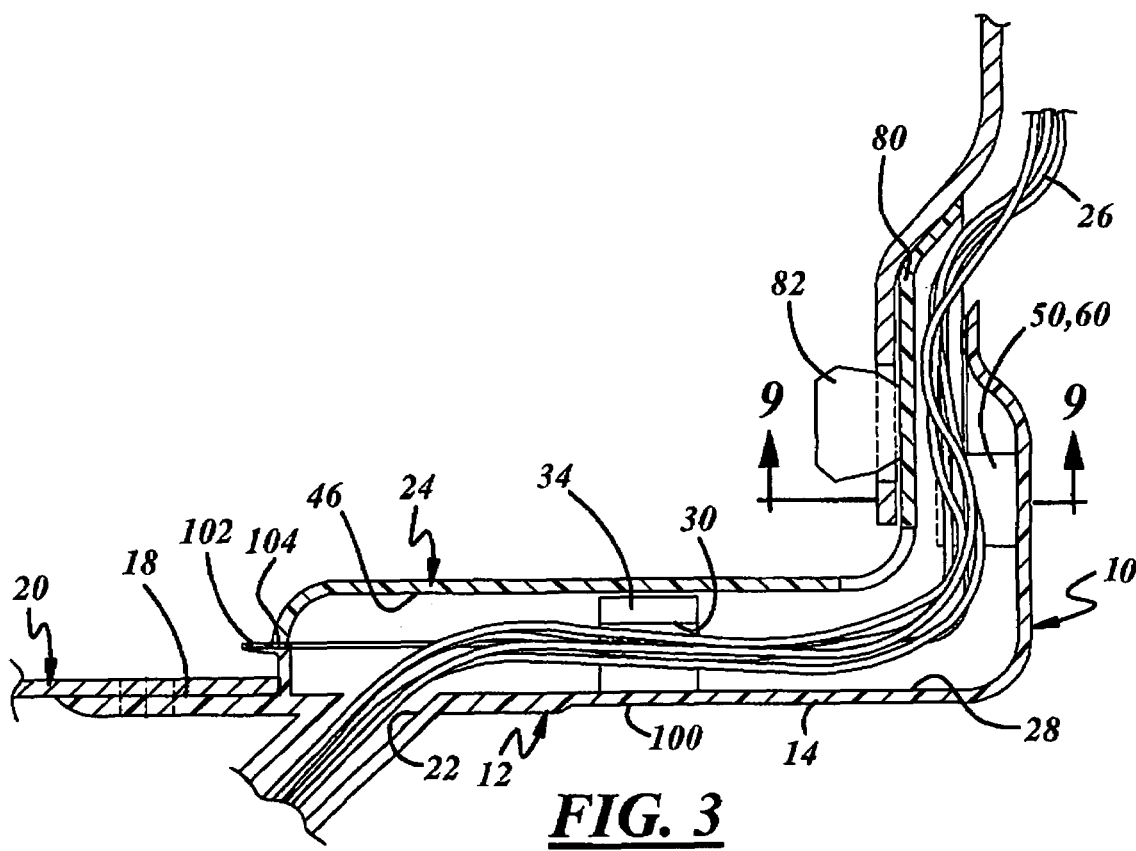
FIG. 3 is partial cross-sectional top view of the installed wire bundle routing assembly and a portion of a front wall of the vehicle door of FIG. 1.

A wire bundle routing assembly for routing and at least partially enclosing and sealing a wire bundle or harness between a vehicle door frame and a passenger compartment side wall of a vehicle door body adjacent hinges pivotally supporting the door on the door frame is generally indicated at 10 in the drawings. The assembly 10 may include a generally right-angular door mounting base 12 having a base front panel 14 slidably receivable in a slot 16 formed in a front wall 18 of a door body 20 adjacent hinges 21 that pivotally support the door body 20 on a door frame as shown in FIGS. 1, 3, 8 and 9. The assembly 10 may further include a wire bundle through-hole 22 formed in the base front panel 14 as shown in FIGS. 3 and 4.

A door mounting base cover 24 encloses and holds a wire bundle 26 against an inner side 28 of the door mounting base 12 when the cover 24 is installed over an inner side 28 of the door mounting base 12 as shown in FIGS. 3, 6, 8, and 9. The cover 24 may thus provide a splash-proof environment within the vehicle door body 20, protecting the wire bundle 26 from water introduced into an interior of the door body through an opening provided for the raising and lowering of a vehicle door window, for example. As shown in FIG. 8, two base slide track detent surfaces 30, 32 may be disposed on respective base slide tracks 34, 36 that integrally extend from the inner side 28 of the door mounting base 12. As is also shown in FIG. 8, the two base slide track detent surfaces 30, 32 may be positioned to engage two corresponding cover slide track detent surfaces 38, 40 that may be disposed on respective cover slide tracks 42, 44 that integrally extend from an underside 46 of the cover 24. The two base slide track detent surfaces 30, 32 cooperate with the two cover slide track detent surfaces 38, 40 to slidably guide the cover 24 into an installed position on the mounting base 12 as shown in FIGS. 3, 6, 8, and 9.

Figure 4:
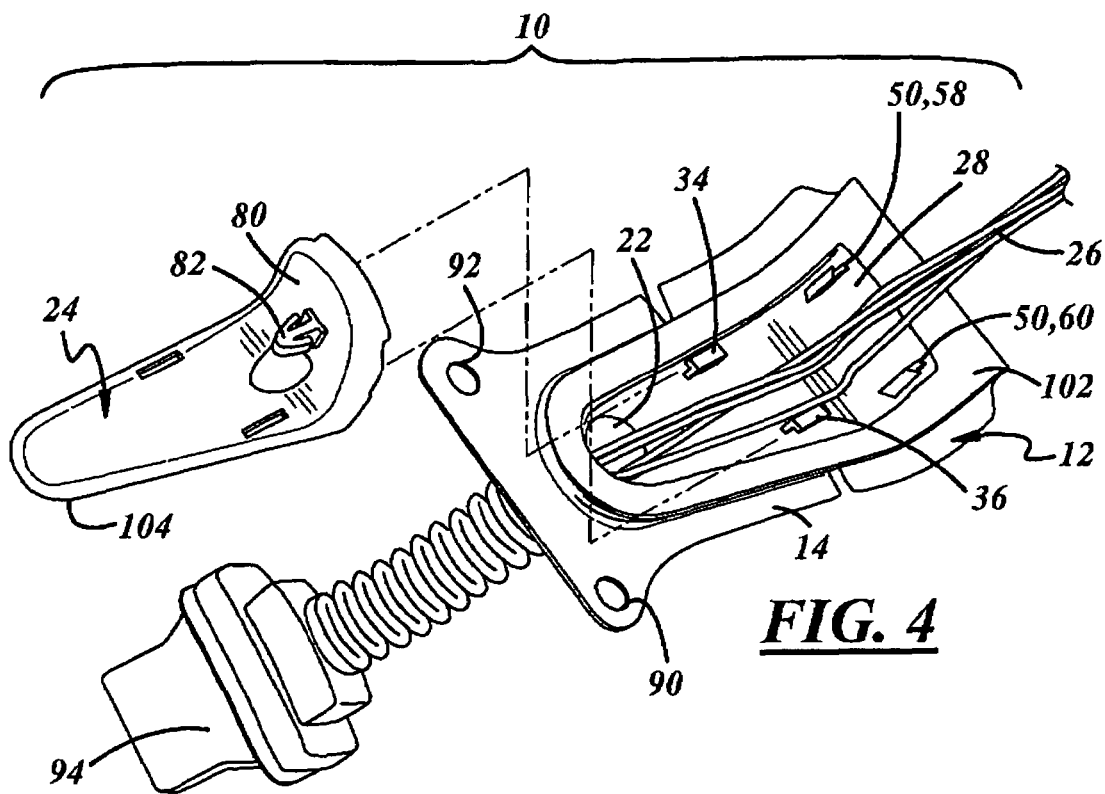
FIG. 4 is a perspective view of the wire bundle routing assembly of FIGS. 1 and 2 with a door mounting base cover of the assembly removed and a wiring bundle shown extending from a tubular bellows of the assembly across a door mounting base of the assembly.
Figure 5:
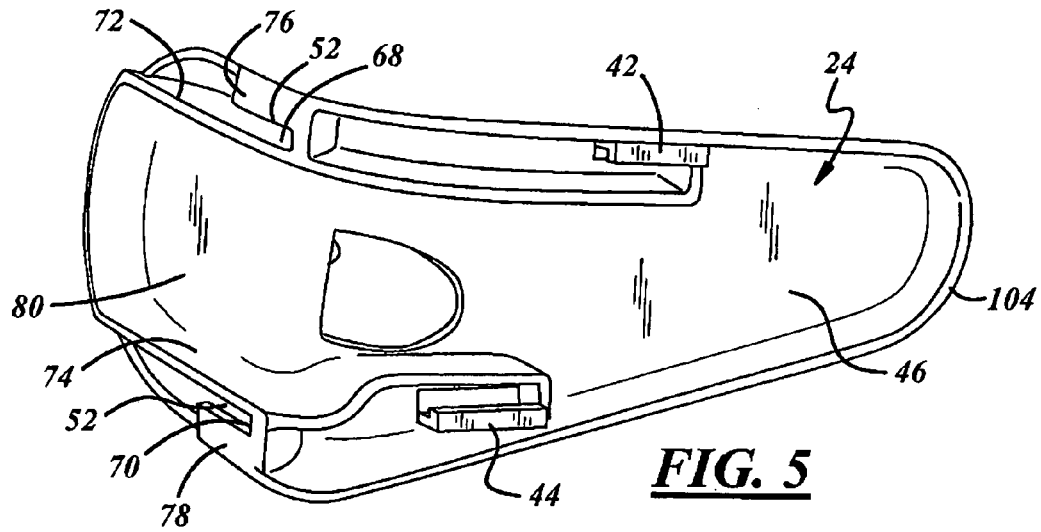
FIG. 5 is a perspective view of an underside of the door mounting base cover of FIG. 4.

The assembly 10 may also include a latch comprising two base latch components 50 carried by the base 12 as shown in FIGS. 4 and 9, and two corresponding cover latch components 52 carried by the cover 24 as shown in FIGS. 5 and 9. The cover latch components 52 may be positioned to engage the base latch components 50 when the cover 24 reaches the installed position, as best shown in FIG. 9, and to retain the cover 24 in the installed position on the base 12. The base and cover latch components 50, 52 may be shaped and positioned to preclude latching engagement unless the base and cover latch components 50, 52 are aligned by proper engagement of the cover slide track detent surfaces 38, 40 with the base slide track detent surfaces 30, 32. This provides an installer with a positive indication as to whether or not the slide track detent surfaces 30, 32, 38, 40 are all properly engaged.

Figure 7:
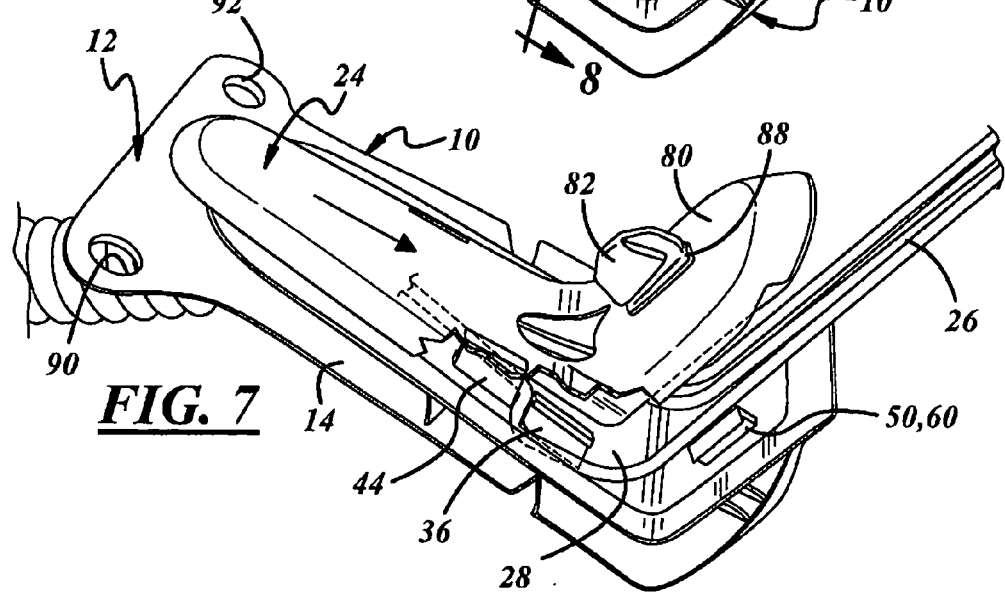
FIG. 7 is a partially cutaway perspective view of the wire bundle routing assembly of FIGS. 1 and 2 showing a mis-routed wire blocking the cover from being moved into the installed position on the base.

As best shown in FIG. 4, a first base slide track detent surface 30 of the two base slide track detent surfaces 30, 32 may be spaced laterally and offset longitudinally from a second base slide track detent surface 32 of the two base slide track detent surfaces 30, 32. Correspondingly, a first cover slide track detent surface 38 of the two cover slide track detent surfaces 38, 40 may be spaced laterally and offset longitudinally from a second cover slide track detent surface 40 of the two cover slide track detent surfaces 38, 40, as is best shown by the positions of the cover slide tracks 42, 44 in FIG. 5. The offset positions of the first and second cover slide track detent surfaces 38, 40 correspond to those of the first and second base slide track detent surfaces 30, 32, allowing the slide tracks 34, 36, 42, 44 to be shorter while easing proper cover installation by more accurately aligning the cover latch components 52 with the base latch components 50. The offset more accurately aligns the latch components 50, 52 by stabilizing the cover 24 against rotational motion relative to the base 12 when the slide track detent surfaces 30, 32, 38, 40 are engaged. In other words, the offset limits the rotational freedom of the cover 24 relative to the base 12. This arrangement also alerts an installer to when a wire has been trapped in an improper position outside a slide track since such a trapped wire will impede engagement of a cover slide track 42, 44 with its corresponding base slide track 34, 36 as shown in FIG. 7.

The base latch components 50 may include respective base latch detent surfaces 54, 56 on respective base latch tabs 58, 60 integrally extending from a side panel 62 of the door mounting base 12 as shown in FIG. 9. The two base latch detent surfaces 54, 56 may be shaped and positioned to engage two corresponding cover latch detent surfaces 64, 66 adjacent slots 68, 70 formed by ribs 72, 74 and webbing 76, 78 that integrally extends from a side panel 80 of the cover 24 as shown in FIGS. 5 and 9. The base and cover latch detent surfaces 64, 66 may be positioned to engage one another only after the base slide track detent surfaces 30, 32 have engaged the cover slide track detent surfaces 38, 40 and the cover 24 has been slid along the detent surfaces 30, 32, 38, 40 to the installed position.

As shown in FIGS. 3, 4, 6, 7, and 9 the cover 24 may include a fastener 82 such as a rosebud clip that may integrally extend from the side panel 80 of the cover 24. The fastener 82 may be positioned to engage a corresponding opening 84 in a passenger compartment-side wall 86 of a vehicle door body 20, as shown in FIG. 9, when the wire bundle routing assembly 10 is slid into position in the slot 16 formed in the front wall 18 of the door body 20. Once installed, the fastener 82 may serve to retain the assembly 10 in the slot 16. The rosebud clip 82 may also include a rubber clip seal 88 that prevents water from passing between the rosebud clip 82 and the corresponding opening 84 in the passenger compartment side wall 86 of the vehicle door body 20. The assembly 10 may be further secured in the slot 16 by passing bolts or screws 89 through a pair of fastener receiving holes 90, 92 formed in the base front panel 14 and into a pair of corresponding fastener receiving holes 93 formed in the front wall 18 of a vehicle door body 20 carrying the assembly 10.

Figure 1:
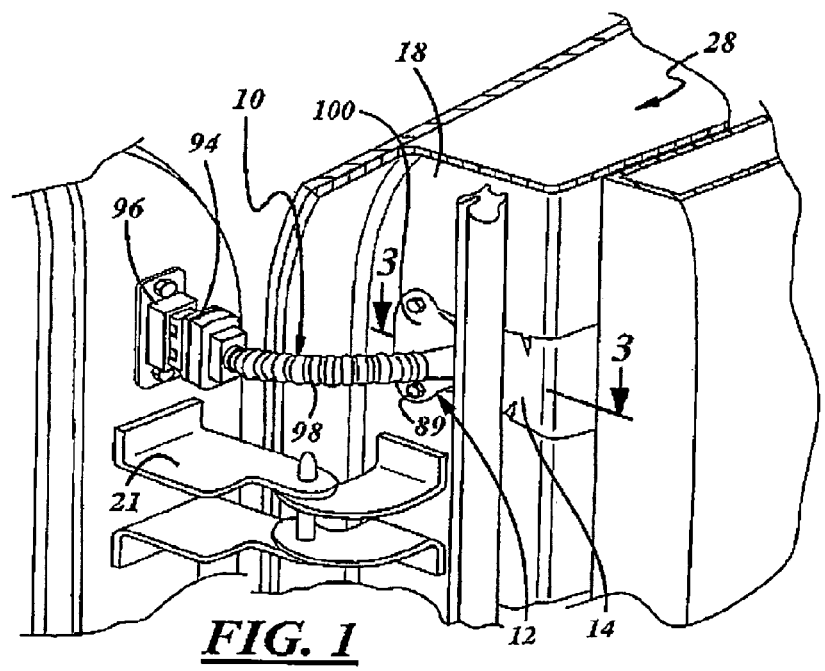
FIG. 1 is a perspective view of a wire bundle routing assembly constructed according to the invention and installed between a vehicle door and a vehicle door frame.
Figure 2:
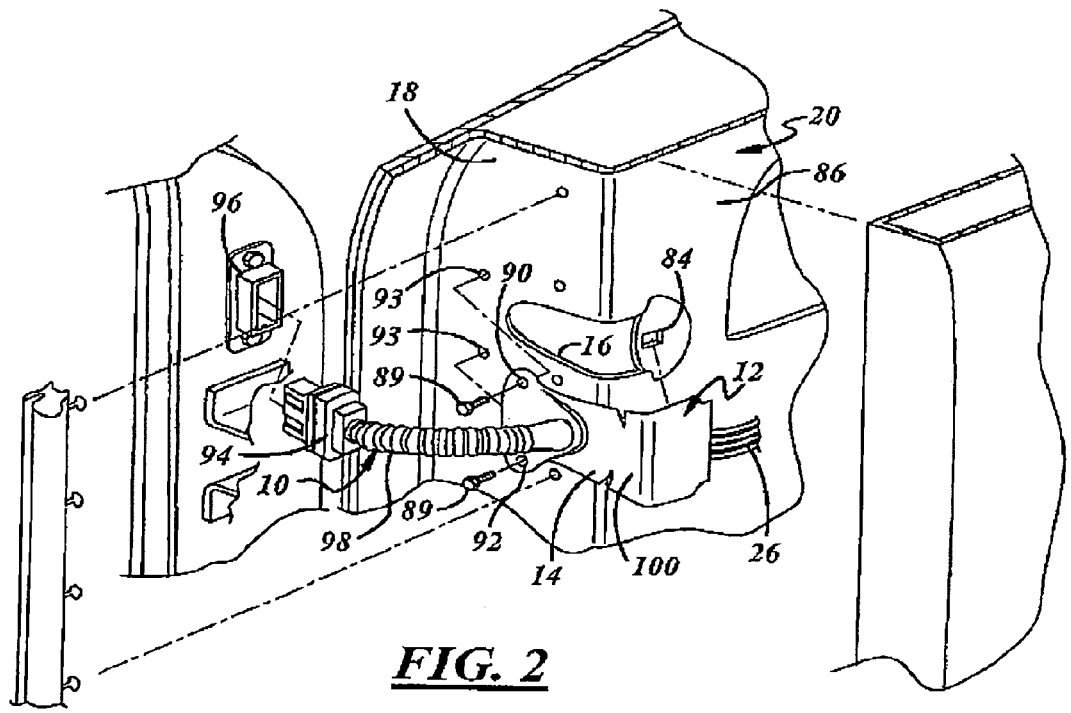
FIG. 2 is a perspective view of the wire bundle routing assembly of FIG. 1 removed from the vehicle door and door frame and exposing a wiring bundle routed by the assembly to a passenger-side of the vehicle door.

As shown in FIGS. 1, 2, and 4, the assembly 10 may further include a door frame connector 94 that connects one end of each wire of a wire bundle 26 to respective terminals of the connector 94. The connector terminals are positioned to engage corresponding terminals in a door frame connector receptacle 96 supported on a vehicle door frame. The door frame connector receptacle terminals provide electrical connections to various current pathways within a vehicle as is well known in the art.

As is also shown in FIGS. 1, 2, and 4, the assembly 10 may also include a tubular bellows 98 extending between and connecting the door frame connector 94 and an outer side 100 of the door mounting base 12 in coaxial alignment with the wire bundle through-hole 22 in the mounting base 12. The bellows 98 flexibly accommodates or supports a portion of a wire bundle 26 extending from the connector 94 to the wire bundle through-hole 22 so that a vehicle door can be opened and closed repeatedly without pinching or otherwise trapping and damaging the wires of the wire bundle 26.

A rubber seal ring 102 may be supported on the door mounting base 12 in a position where the ring 102 will lie between a peripheral edge 104 of the cover 24 and the inner side 28 of the door mounting base 12 when the cover 24 is in the installed position on the mounting base 12. The seal ring 102 prevents moisture from passing between the door mounting base 12 and the cover 24 when the cover 24 is installed. In other words, when the cover 24 is in the installed position on the mounting base 12, the rubber seal ring 102 is sandwiched between the peripheral edge 104 of the cover 24 and the inner surface of the door mounting base 12.

Figure 6:
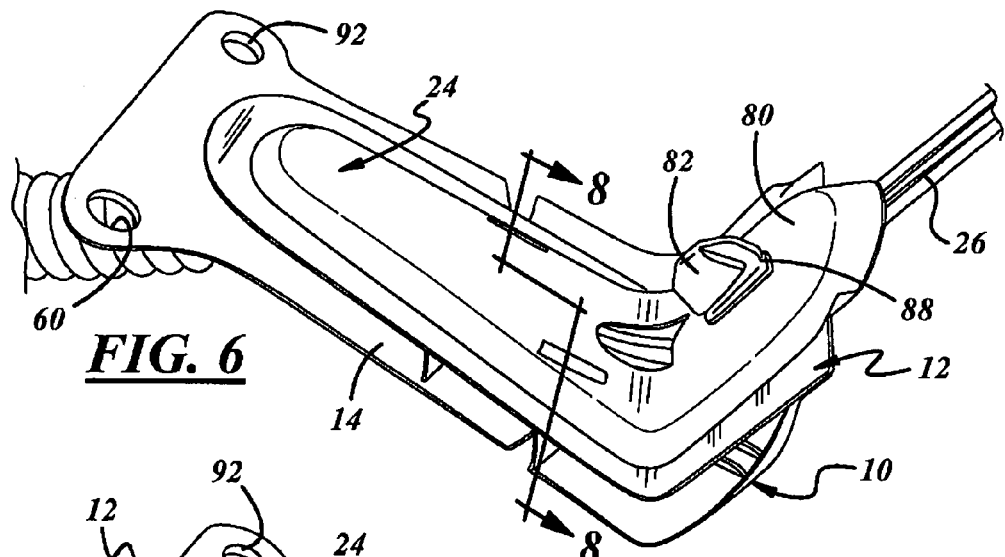
FIG. 6 is a perspective view of the wire bundle routing assembly of FIG. 1 and 2 with the cover in an installed position on the door mounting base.

In practice, the wire bundle routing assembly 10 is installed by providing a wire bundle 26 in the through-hole 22 formed in the base front panel 14, connecting one end of each wire of the wire bundle 26 to respective terminals in the door frame connector 94, and connecting one end of the tubular bellows 98 to the door frame connector 94 and the other end of the tubular bellows 98 to the door mounting base 12 in coaxial alignment with the wire bundle through-hole 22 so that a portion of the wire bundle 26 is carried by the tubular bellows 98 and the remainder extends from the wire bundle through-hole 22 on an inner side 28 of the door mounting base 12 as shown in FIG. 4. A portion of the wire bundle 26 may then be enclosed against an inner side 28 of the door mounting base 12 by installing the cover 24 on the inner side 28 of the door mounting base 12 as shown in FIG. 6. This may include engaging the cover slide track detent surfaces 38, 40 against the base slide track detent surfaces 30, 32 and sliding the cover 24 along tracks defined by the engagement of the detent surfaces 30, 32, 38, 40 until the cover 24 reaches an installed position on the mounting base 12, with the base slide track detent surfaces 30, 32 cooperating with the cover slide track detent surfaces 38, 40 in guiding the cover 24 into the installed position. When the cover reaches the installed position the two cover latch detent surfaces 64, 66 engage the two base latch detent surfaces 54, 56 as shown in FIG. 9 and retain the cover 24 in the installed position on the base 12.

The assembly 10 may then be installed in a vehicle by sliding the assembly 10 into a slot 16 formed in a front wall 18 of a door body 20 until the rosebud connector 94 engages the corresponding opening 84 in the passenger compartment side wall 86 of the door body 20 as shown in FIG. 9. Bolts or screws may then be installed through the fastener receiving holes 90, 92 in the base 12 and in the front wall 18 of the vehicle door body 20. The door frame connector 94 may be plugged into the door frame connector receptacle 96 at any point in the installation process. The wires of the wire bundle 26 may be connected, also at any point in the installation process, to various door-mounted devices such as power window controllers and mirror position controllers.

This description, rather than describing limitations of an invention, only illustrates (an) embodiment(s) of the invention recited in the claims. The language of this description is therefore exclusively descriptive and is non-limiting. Obviously, it's possible to modify this invention from what the description teaches. Within the scope of the claims, one may practice the invention other than as described above.

I claim:

1. A wire bundle routing assembly for routing and at least partially enclosing a wire bundle or harness between a vehicle door frame and a passenger compartment side of a vehicle door body adjacent hinges pivotally supporting the door on the door frame, the assembly comprising:
    a door mounting base slidably receivable in a slot formed in a front wall of a door body and including a wire bundle through-hole formed in the door mounting base;
    a door mounting base cover configured to enclose and hold a wire bundle against an inner side of the door mounting base when the cover is installed over the inner side of the door mounting base; and
    a first base slide track detent surface on the door mounting base configured and positioned to engage a corresponding first cover slide track detent surface on the cover and to guide the cover as the cover is slid into an installed position on the door mounting base.

2. A wire bundle routing assembly as defined in claim 1 and further including:
    a latch comprising a base latch component carded by the base; and
    a cover latch component carried by the cover, the cover latch component configured to engage the base latch component when the cover reaches the installed position and to retain the cover in the installed position on the base latch component.

3. A wire bundle routing assembly as defined in claim 2 in which the latch is configured such that the cover latch component cannot engage the base latch component unless aligned by proper engagement of the first cover slide track detent surface with the first base slide track decent surface.

4. A wire bundle routing assembly as defined in claim 2 in which:
    the cover includes a second cover slide crack detent surface; and
    the door mourning base includes a second base slide track detent surface configured and positioned to engage the corresponding second cover slide track detent surface and to cooperate with the first base slide track detent surface and the first cover slide track detent surface in guiding the cover into the installed position.

5. A wire bundle routing assembly as defined in claim 4 in which the latch is configured such that the cover latch component cannot engage the base latch component unless aligned by proper engagement of the first and second cover slide track decent surfaces with the respective first and second base slide track detent surfaces.

6. A wire bundle routing assembly as defined in claim 4 in which:

the first base slide track detent surface is spaced laterally and offset longitudinally from the second base slide track detent surface; and the first cover slide track detent surface is spaced laterally and offset longitudinally from the second cover slide track detent surface such that the offset positions of the first and second cover slide track detent surfaces correspond to those of the first and second base slide track detent surfaces.

7. A wire bundle routing assembly as defined in claim 2 in which the base latch component includes a first base latch detent surface on the door mounting base configured and positioned to engage a first corresponding cover latch detent surface on the cover once the first base slide track detent surface has engaged the first cover slide detent surface and the cover has been slid along the first base latch detent surfaces to the installed position.

8. A wire bundle routing assembly as defined in claim 7 in which the base latch component includes a second base latch detent surface on the door mounting base configured and positioned to engage a second corresponding cover latch detent surface on the cover once the second base slide track detent surface has engaged the second cover slide detent surface and the cover has been slid along the detent surfaces to the installed position.

9. A wire bundle routing assembly as defined in claim 1 in which the cover includes a fastener chat extends from a side panel of the cover and is configured and positioned to engage a corresponding opening in the passenger compartment side of a vehicle door body when the wire bundle routing assembly is slid into position in a slot formed in a front wall of such said vehicle door body and to retain the assembly in the slot.

10. A wire bundle routing assembly as defined in claim 1 further including a door frame connector configured to connect one end of each wire of said wire bundle to respective current pathways where those pathways connect to corresponding current pathways in a complementary door frame connector receptacle supported on a vehicle door frame.

11. A wire bundle routing assembly as defined in claim 10 further including a tubular bellows extending between and connecting the door frame connector and an outer side of the door mounting base in coaxial alignment with the wire bundle through-hole and configured to flexibly support said wire bundle extending through the wire bundle through-hole to the door frame connector.

12. A wire bundle routing assembly as defined in claim 1 in which a seal ring disposed between a peripheral edge of the cover and the inner side of the door mounting base when the cover is in the installed position on the mounting base and configured to prevent moisture from passing between the door mounting base and the cover when the cover is installed.

13. A method for routing and at least partially enclosing a wire bundle between a vehicle door frame and a passenger compartment side of a vehicle door body adjacent hinges pivotally supporting the door on the door frame, the method including the steps of:

providing a wire bundle routing assembly including a door mounting base, a door mounting base cover, a first base slide crack detent surface on the door mounting base, and a first cover slide crack detent surface on the cover;

providing a wire bundle in a through-hole formed in the front panel of the door mounting base; and enclosing a portion of the wire bundle against an inner side of the door mounting base by installing the cover on the inner side of the door mounting base, the enclosing step including engaging the first cover slide track detent surface against the first base slide track detent surface and sliding the cover along a track defined by the engagement of the first cover slide track decent surface with the first base slide track detent surface until the cover reaches an installed position on the mounting base.

14. The method of claim 13 in which:

the step of providing a wire bundle routing assembly includes providing a second base slide track detent surface on the door mounting base and a second cover slide track detent surface on the cover; and the enclosing step includes causing the second base slide track detent surface to engage the corresponding second cover slide track detent surface on the cover and to cooperate with the first base slide track detent surface and the first cover slide track detent surface in guiding the cover into the installed position.

15. The method of claim 14 in which the step of providing a wire bundle routing assembly includes:

providing the second slide track detent surface in a position spaced laterally and offset longitudinally from the first base slide track detent surface; and providing the second cover slide track detent in a position spaced laterally and offset longitudinally from the first cover slide track detent.

16. The method of claim 13 in which:

the step of providing a wire bundle routing assembly includes providing a latch comprising a base latch component carried by the base and a cover latch component carried by the cover; and the enclosing step includes sliding the cover until the cover latch component engages the base latch component in the installed position.

\* \* \* \* \*